(12) United States Patent
Stuckey et al.

(10) Patent No.: US 6,662,453 B1
(45) Date of Patent: Dec. 16, 2003

(54) CUTLERY CENTER

(75) Inventors: Michael J. Stuckey, Glen Allen, VA (US); Phillip L. Brookshire, Cincinnati, OH (US); Anthony V. Cruz, Westlake Village, CA (US)

(73) Assignee: Hamilton Beach/Proctor Silex, Inc., Glen Allen, VA (US)

( * ) Notice: Subject to any disclaimer, the term of this patent is extended or adjusted under 35 U.S.C. 154(b) by 0 days.

(21) Appl. No.: 09/823,232

(22) Filed: Mar. 30, 2001

Related U.S. Application Data
(60) Provisional application No. 60/193,609, filed on Mar. 31, 2000.

(51) Int. Cl.[7] ................................................ A47J 21/14
(52) U.S. Cl. ..................................... 30/298.4; 248/37.3
(58) Field of Search .................... 30/298.4, DIG. 1, 30/277.4; 248/37.3; 206/553; D7/637–641; 211/70.7, 70.6

(56) References Cited

U.S. PATENT DOCUMENTS

| | | | |
|---|---|---|---|
| 2,157,412 A | 5/1939 | Hopkins | |
| D200,709 S | 3/1965 | Shalvoy et al. | |
| D204,479 S | 4/1966 | Cassidy | |
| 3,292,885 A | 12/1966 | Stephens et al. | |
| 3,348,116 A | 10/1967 | Freeman et al. | |
| 3,583,104 A * | 6/1971 | Petroske | 51/102 |
| D247,735 S | 4/1978 | Gangelhoff et al. | |
| D292,359 S | 10/1987 | Daw | |
| 4,970,006 A | 11/1990 | Martinez | |
| D317,698 S | 6/1991 | Martinez | |
| D360,810 S | 8/1995 | Humaj | |
| 6,244,153 B1 * | 6/2001 | McInnes et al. | 83/870 |

* cited by examiner

*Primary Examiner*—Douglas D. Watts
(74) *Attorney, Agent, or Firm*—Roger S. Dybvig

(57) ABSTRACT

A cutlery center including a support block having at least one knife blade-receiving cavity and a battery charging stand for an electric knife affixed to the support block.

4 Claims, 2 Drawing Sheets

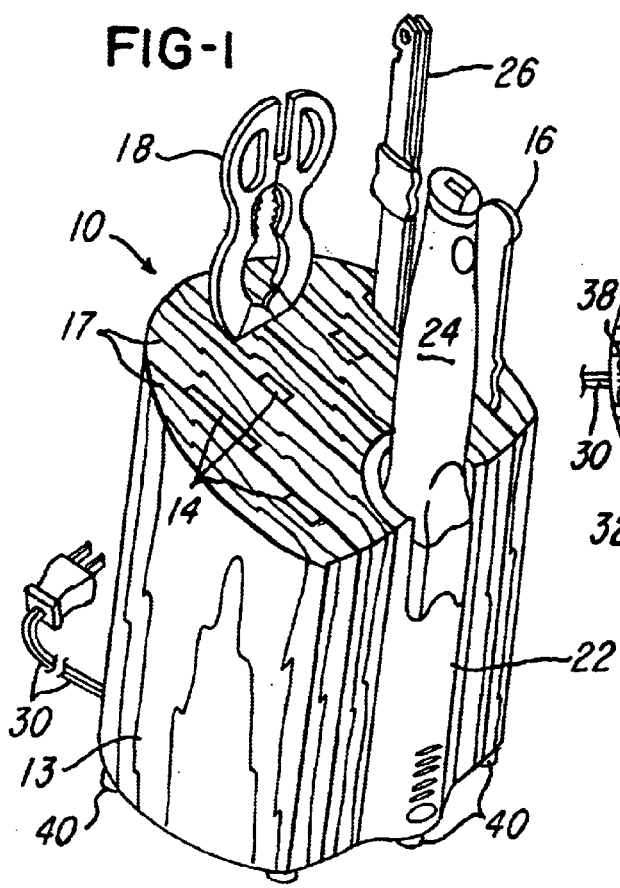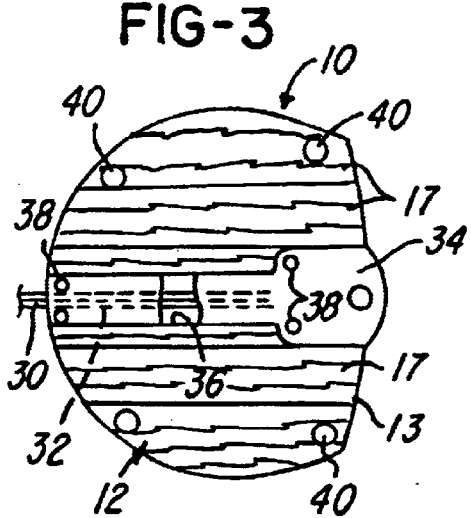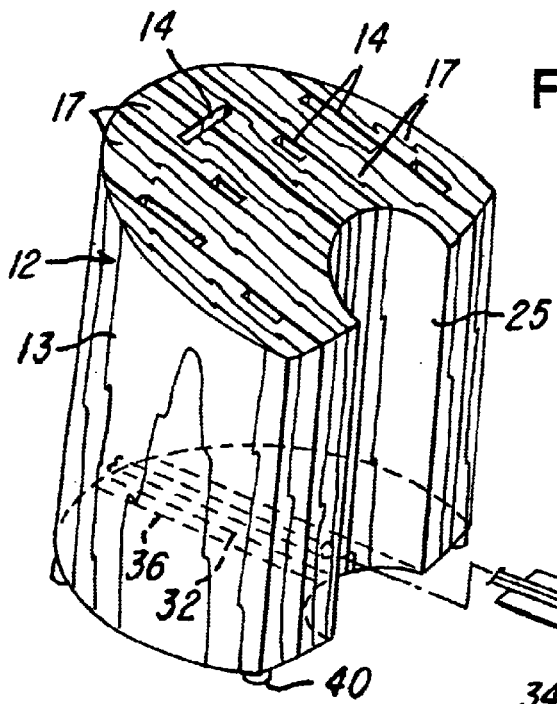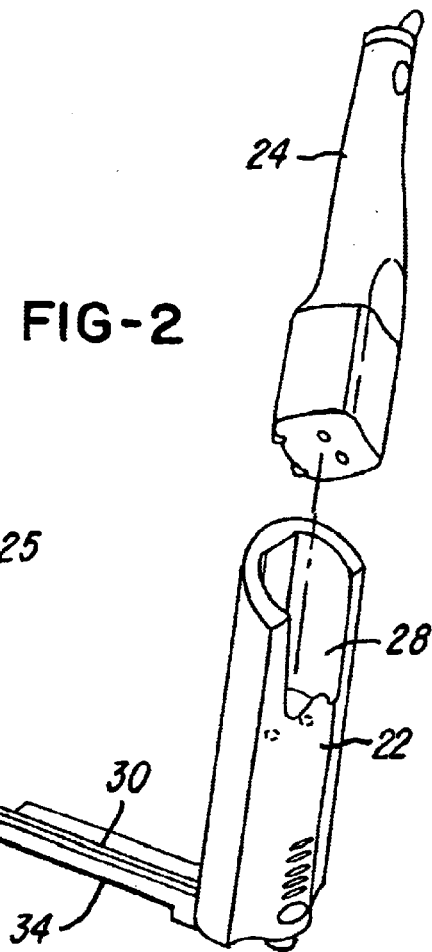

CUTLERY CENTER

CROSS-REFERENCE TO RELATED APPLICATION

This application claims the benefit of provisional patent application, Ser. No. 60/193,609, filed Mar. 31, 2000.

FIELD OF THE INVENTION

This invention relates to a cutlery center for storing cutlery, such as kitchen knives and scissors.

BACKGROUND OF THE INVENTION

Knife storage devices comprising wood blocks with elongate knife blade-receiving cavities open at the tops of the blocks have been found useful for storing kitchen knives, such as carving knives and paring knives. Such knife storage devices are stable and securely hold knives in an upright orientation with their blades in a protected position.

Storage devices have also been provided for electric knives and their blades.

SUMMARY OF THE INVENTION

An object of this invention is to provide a cutlery center which provides for the storage of ordinary kitchen knives and also for the storage of a rechargeable electric knife assembly.

A cutlery center in accordance with this invention comprises a relatively massive support block which may be made from wood and provided with plural elongate cavities, each cavity having an outer end open to an outer surface of the support block and an inner end inside the support block. The cavities are of dimensions suitable for receiving the blades of kitchen knives or other cutlery devices, such as the blades of a kitchen scissors.

Further in accordance with this invention, the cutlery center includes an electric knife assembly including an electric knife powered by a rechargeable battery located in its handle, and a battery charging stand for storing the knife handle while charging the rechargeable battery. The knife blade-receiving cavities may include a cavity suitably sized and shaped to store the blades of the electric knife. The battery charging stand is integrally formed with the support block.

The foregoing and other objects and advantages of this invention will become apparent from the following description and the accompanying drawings.

BRIEF DESCRIPTION OF THE DRAWINGS

FIG. 1 is a perspective view showing a cutlery center in accordance with this invention.

FIG. 2 is an exploded perspective view of portions of the cutlery center of FIG. 1.

FIG. 3 is a bottom plan view, partly broken away, of the cutlery center of FIG. 1 shown on a reduced scale.

DETAILED DESCRIPTION

Figure 4:
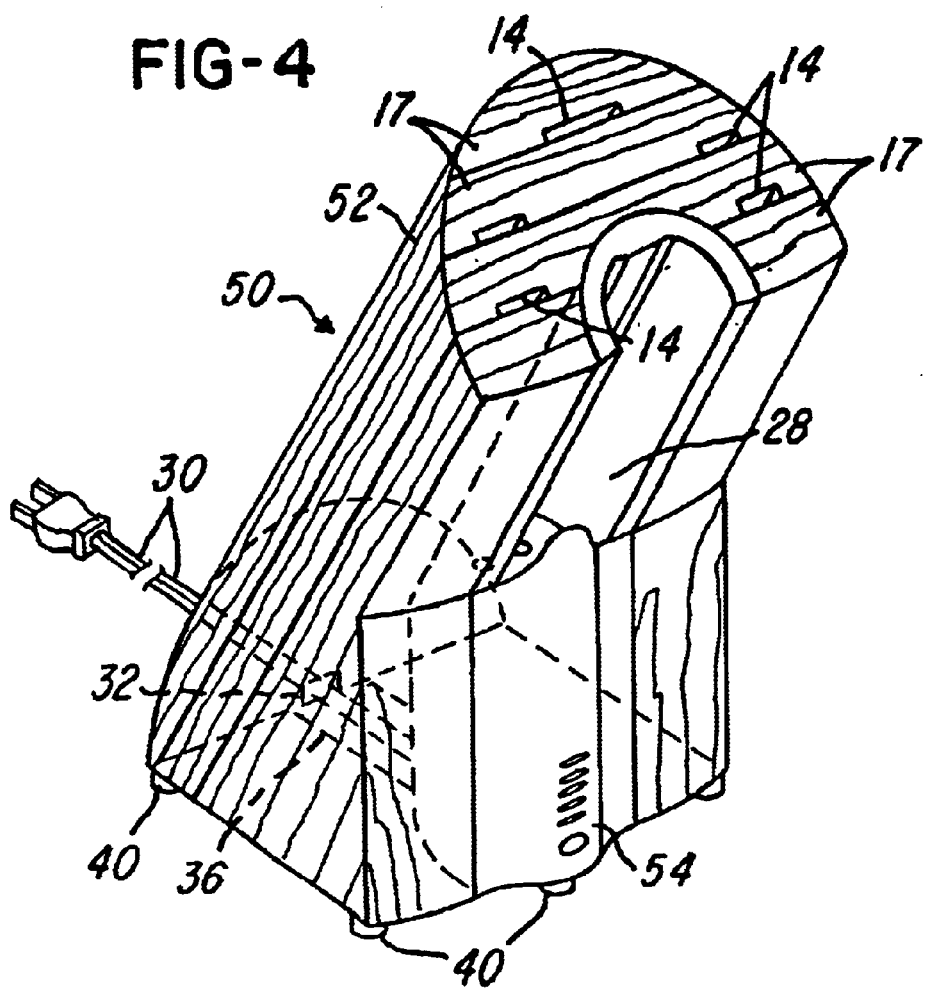
FIG. 4 is a perspective view showing a second embodiment of a cutlery center in accordance with this invention.

FIGS. 1 and 2 illustrate a first embodiment of a cutlery center, generally designated 10, in accordance with this invention which comprises a free-standing, self-supporting support block 12 having plural cutlery-receiving cavities 14 that open to the top of the block 12. The cavities 14 may extend completely through the block 12 or may have closed lower ends inside the block 12. Blades of various kitchen knives, such as the illustrated knife 16, are housed within individual cavities 14, as may be the blades of a kitchen scissors 18.

The support block 12 has a main body 13 made from laminated wood to resemble a butcher block, but could be made from other construction materials. During manufacture of the main body 13, some (one or more) of the laminations, designated 17, are grooved to partly form the cavities 14. The laminations are thereafter glued together in face-to-face relationship to complete the formation of the block 12 and the cavities 14 therein.

In accordance with this invention, the cutlery center 10 includes a battery-operated electric knife assembly comprising a battery charging stand 22 integrally connected to the main body 13 of the support block 12, an electric knife handle 24, which houses a drive motor (not shown) and a rechargeable battery (not shown), and a knife blade assembly 26 adapted to be inserted into the handle 24 and operated by the drive mechanism incorporated in the handle 24. The electrical and mechanical drive members of the knife assembly may be entirely conventional and form no part of the present invention. Therefore, they are not illustrated or further described herein.

The battery charging stand 22 is nested in a forwardly-facing and open groove or nest 25 in the main body 13. The charging stand housing includes an upwardly-facing pocket 28 that snugly receives the butt end of the electric knife handle 24. Electrical house current is supplied to a battery charging circuit (not shown) within the charging stand 22 by a power cord 30 that extends from the charging stand 22 through a cord channel 32 formed on the bottom of the support block 12 to the rear of the block 12. As best seen in FIGS. 2 and 3, a base cover plate 34 integral with the housing of the charging stand 22 not only covers the bottom of the charging stand 22 but also overlies the otherwise open bottom of the cord channel 32 and engages along recessed shoulders 36 that border along the sides of the cord channel 32. Mounting screws 38 connect the base cover plate 34 and, accordingly, the entire charging stand 22 to the main body 13 of the support block 12. The construction is such that the bottom lower surface of the support block 12, including the bottom surface of the main body 13 and the bottom surface of the base cover plate 34, are coplanar. Other fasteners (not shown) or a suitable cement could also be used to ensure that the battery charging stand is integrally connected to the support block body 13. Small feet or support pads 40 are preferably provided to support the support block above a kitchen counter or, other supporting surface.

Figure 5:
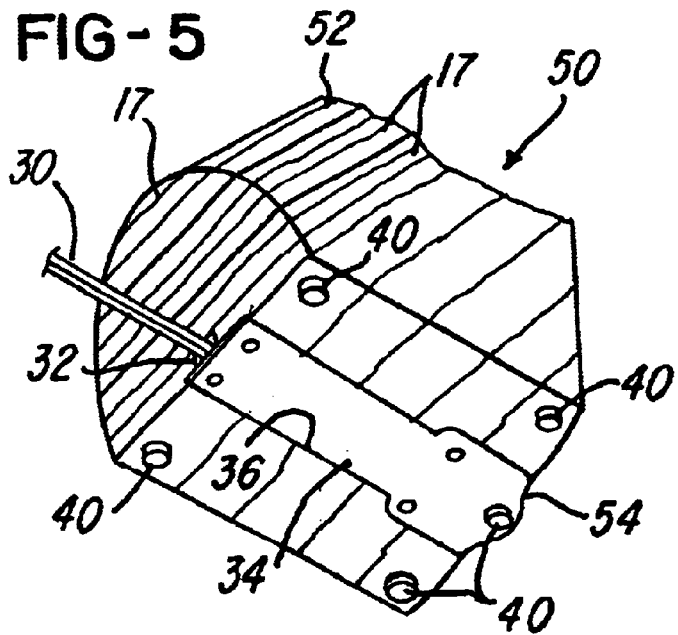
FIG. 5 is a fragmentary perspective view of the cutlery center of FIG. 4.

FIGS. 4 and 5 show a second embodiment of a cutlery center, generally designated 50, in accordance with this invention, which is designed to receive and support items of cutlery (not shown in FIGS. 4 and 5) so that their handles project both forwardly and upwardly at an angle relative to vertical of approximately 45°. This construction may be advantageous if the cutlery center 50 is to be stored under a kitchen counter. Due to this construction, the cutlery handles project from the support block 52 at an angle convenient to the user.

In order to support the cutlery at an approximately 45° angle, the upper portion of the support block 52 of FIGS. 4 and 5 projects upwardly and forwardly from the lower portion of the support block 52. Accordingly, the upper portion of the battery charging stand, designated 54, of FIGS. 4 and 5, is angled upwardly and forwardly relative to the lower portion of the charging stand 54. Otherwise, the construction of the cutlery center 50 of FIGS. 4 and 5. is essentially the same as the first embodiment described above in relation to FIGS. 1, 2 and 3, and like reference numbers indicate like parts.

Although the presently preferred embodiments of this invention have been described, it will be understood that within the purview of the invention various changes may be made within the scope of the following claims.

We claim:

1. A cutlery center comprising a support block having at least one knife blade-receiving cavity, an electric knife assembly including a battery-powered knife comprising a handle and a removable knife blade assembly, said cutlery center further including a battery charging stand for receiving and charging said knife when not in use, said stand being affixed to said support block, said support block having a groove in which said charging stand is nested.

2. A cutlery center comprising a support block having at least one knife blade-receiving cavity, an electric knife assembly including a battery-powered knife comprising a handle and a removable knife blade assembly, said cutlery center further including a battery charging stand for receiving and charging said knife when not in use, said stand being affixed to said support block, said battery charging stand having a power cord for connection to house current, and said support block having a channel extending from said charging stand to an exposed face of said support block, said power cord extending through said channel.

3. The cutlery center of claim 2 wherein said channel extends along the bottom of said support block, and a cover plate is affixed to said support block in covering relation to said channel.

4. The cutlery center of claim 2 wherein said charging stand has an upper portion and a lower portion, said upper portion extending forwardly and upwardly from said lower portion.

* * * * *